United States Patent
Ahuja et al.

(10) Patent No.: US 6,408,118 B1
(45) Date of Patent: Jun. 18, 2002

(54) OPTICAL WAVEGUIDE GRATINGS HAVING ROUGHENED CLADDING FOR REDUCED SHORT WAVELENGTH CLADDING MODE LOSS

(75) Inventors: Ashish Ahuja, Paramus; Benjamin John Eggleton, Summit; Jon W. Engelberth, Denville, all of NJ (US); Arturo Hale, New York, NY (US); Glen Robert Kowach, Fanwood, NJ (US); Sharad Ramanathan, Springfield, NJ (US); Steven Herbert Simon, Hoboken, NJ (US); Paul Stephen Westbrook, Chatham, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 4 days.

(21) Appl. No.: 09/648,948

(22) Filed: Aug. 25, 2000

(51) Int. Cl.$^7$ .................................................. G02B 6/34
(52) U.S. Cl. ......................... 385/37; 385/24; 385/123; 385/28; 385/29; 359/130
(58) Field of Search ......................... 385/37, 24, 123, 385/28, 29; 359/130

(56) References Cited

U.S. PATENT DOCUMENTS 3,891,302 A * 6/1975 Dabby ........................ 385/37
4,665,660 A * 5/1987 Jablonski .................... 451/28
4,676,594 A * 6/1987 Presby ....................... 385/28
5,411,566 A * 5/1995 Poole ........................ 385/128
6,301,418 B1 * 10/2001 Freier ........................ 385/123

OTHER PUBLICATIONS

L. Dong, et al., "Optical fibers with depressed claddings for suppression of coupling into cladding modes in fiber gratings", IEEE Photonics Technology Letters, 9(1), pp. 64–66, 1997.*

* cited by examiner

Primary Examiner—Cassandra Spyrou
Assistant Examiner—Leo Boutsikaris
(74) Attorney, Agent, or Firm—Lowenstein Sandler PC

(57) ABSTRACT

In accordance with the invention, an optical waveguide comprising a longitudinally extending core housing an optical grating and a cladding layer peripherally surrounding the core, is provided with an outer surface of the cladding layer having one or more perturbations. Each perturbation has a height with respect to the core that varies by at least 0.1 times a Bragg wavelength of the grating over the surface of the perturbation and covers an extent of the outer surface whose linear dimensions are less than 1 cm. The perturbations suppress cladding mode spectra and reduce short wavelength cladding mode loss.

21 Claims, 11 Drawing Sheets

OPTICAL WAVEGUIDE GRATINGS HAVING ROUGHENED CLADDING FOR REDUCED SHORT WAVELENGTH CLADDING MODE LOSS

FIELD OF THE INVENTION

This invention relates to optical waveguide devices and, in particular, to optical waveguide Bragg gratings.

BACKGROUND OF THE INVENTION

Optical waveguide Bragg gratings are critical components in WDM communication systems. They perform several key applications including add/drop filtering, band filtering, and dispersion compensation. In these applications the grating is typically used as a reflective filter. Incident light within the stopband of the grating is strongly reflected whereas light outside the stopband is transmitted. An ideal Bragg grating would possess a rectangular amplitude filter function. The reflection would be unity within the stopband and negligible outside the stopband.

In practice, an important limitation on a realistic optical waveguide Bragg grating is cladding mode loss on the short wavelength side of the main reflection band. This short wavelength cladding mode loss is caused by grating-induced coupling from the core mode into backward propagating cladding modes. The cladding mode loss is seen in the transmission spectrum as sharp resonances on the short wavelength side of the Bragg resonance. The magnitude of the loss scales approximately with the square of the strength of the grating, and the loss is dramatically exacerbated when many gratings are cascaded. It thus imposes strict limitations on the design of optical networks that use grating-based technologies.

Proposed approaches to reduce cladding mode losses in optical waveguide Bragg gratings fall into two basic categories. The first is reduction of core-cladding coupling through special design of the core region. Such reduction can be achieved by the depressed cladding design, the high delta design and the photosensitive cladding design. The second basic category involves applying polymer surface coatings to smooth the sharp resonant structure of the cladding mode spectrum and achieve, instead, an approximately uniform background loss.

The depressed cladding design was proposed by Dong et al. in "Optical fibers with depressed claddings for suppression of coupling into cladding modes in fiber Bragg gratings", *IEEE Photonic Technology Letters*, Vol. 9, pp. 64–66 (1997). A conventional waveguide core is surrounded by a lighter doped cladding region i.e. a cladding with a lower index of refraction. The depressed cladding region suppresses the overlap of lower order cladding modes with the core. The transverse oscillations are stretched in the depressed cladding region, since the transverse resonance condition is associated with the optical path length (distance times refractive index). This approach has achieved moderate success. But the reduction is limited by the amount that the index can be reduced in the depressed cladding region.

The high delta design involves increasing the offset of the cladding mode from the Bragg resonance. This is achieved by increasing the effective core refractive index so that it is substantially above that of the lowest order cladding mode. The result is that the cladding mode resonances are offset from the Bragg resonance. Various groups have demonstrated that a waveguide with $\Delta \sim 2\%$, and a core diameter of $d \sim 2$ $\mu$m, results in an offset of $\sim 2$–$5$ nm. Although the high delta principle has been demonstrated, the usable bandwidth is still limited by the onset of cladding mode loss. In addition there is a significant penalty incurred due to mode mismatch between the grating waveguide and the transmission waveguide.

The photosensitive cladding design incorporates photosensitive material into the cladding. See E. Delevaque et al. "Optical fiber design for strong gratings photoimprinting with radiation mode suppression," OFC '95, PD5, (1995) and K. Oh et al., "Suppression of cladding mode coupling in Bragg grating using $GeO_2B_2O_3$ doped photosensitive cladding optical fiber," *Electronic Letters*, Vol. 35, pp. 423–424 (1999). After UV exposure, the grating region extends into the cladding. If the core and cladding have the same sensitivity and there is no blaze, and the exposure is uniform through the waveguide, then the grating will have negligible coupling to cladding modes. Thus cladding mode loss will be negligible. A disadvantage of this scheme is a net reduction in the grating strength due to absorption in the photosensitive cladding region. There is also increased coupling to asymmetric modes because of the increased asymmetry in the region where these modes have a large mode field strength.

Turning to the second basic approach, the waveguide is typically surrounded with a lossy polymer material that has a refractive index near that of the cladding glass. In this case the cladding mode extends into the polymer where it is absorbed, and thus core-cladding mode coupling is reduced. The cladding mode loss is reduced closer to the radiation limit, typically by a factor of 4–5. This loss is acceptable for many applications but can still limit the number of devices that can be cascaded. Accordingly, there is a need for improved optical waveguide gratings having reduced cladding mode loss.

SUMMARY OF THE INVENTION

In accordance with the invention, an optical waveguide comprising a longitudinally extending core housing an optical grating and a cladding layer peripherally surrounding the core, is provided with an outer surface of the cladding layer having perturbations. Each perturbation has a height with respect to the core that varies by at least 0.1 times a Bragg wavelength of the grating over the surface of the perturbation and covers an extent of the outer surface whose linear dimensions are less than 1 cm. The perturbations suppress cladding mode spectra and reduce short wavelength cladding mode loss.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for illustrating the concepts of the invention and, except for the graphs, are not to scale.

DETAILED DESCRIPTION

This description is divided into three parts. Part I describes a conventional grating and the problem to which the invention is directed. Part II describes improved gratings in accordance with the invention, and Part III describes preferred applications of the improved gratings.

I. Cladding Mode Loss In Conventional Gratings

Figure 1:
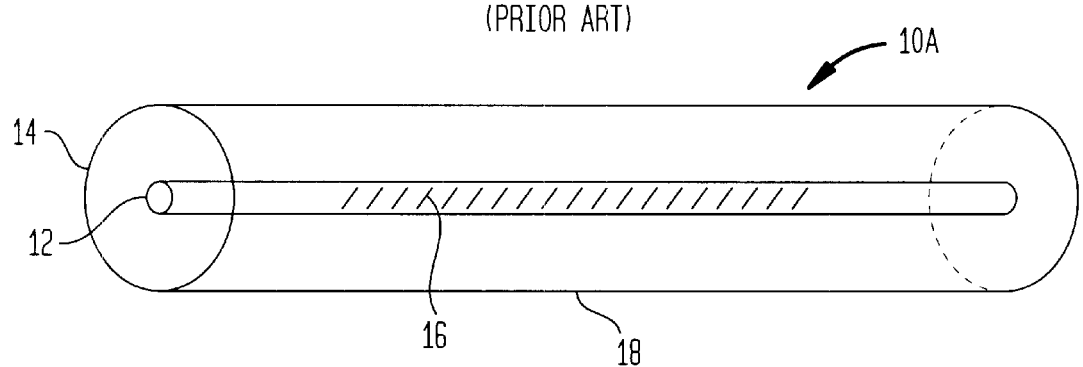
FIG. 1 is a schematic illustration of a conventional optical fiber grating.

Referring to the drawings, FIG. 1, which is prior art, schematically illustrates a conventional optical waveguide grating. The exemplary grating comprises an optical fiber 10A including a core 12 and a peripherally surrounding cladding 14. The outer surface 18 of the cladding 14 is smooth and highly reflective. The core is typically doped silica and includes a grating 16 comprising a plurality of index perturbations periodically induced along its length as by ultraviolet radiation. The core radius can be 3 $\mu$m. The cladding is typically undoped silica. It can have a diameter of 125 $\mu$m, and the index differential between core and cladding can be $\Delta n = 0.01$. The index differential between the core and an index perturbation is typically on the order of 0.0001. A typical grating period is on the order of 531.9 nm, and a typical grating length is 4 cm.

In operation, when light of wavelength in the range 1500–1600 nm is transmitted into the grating, a Bragg resonance wavelength will be strongly reflected. But, in addition, there will be an unwanted loss of wavelengths shorter than the Bragg resonance due to coupling into back-propagating cladding modes.

Figure 2:
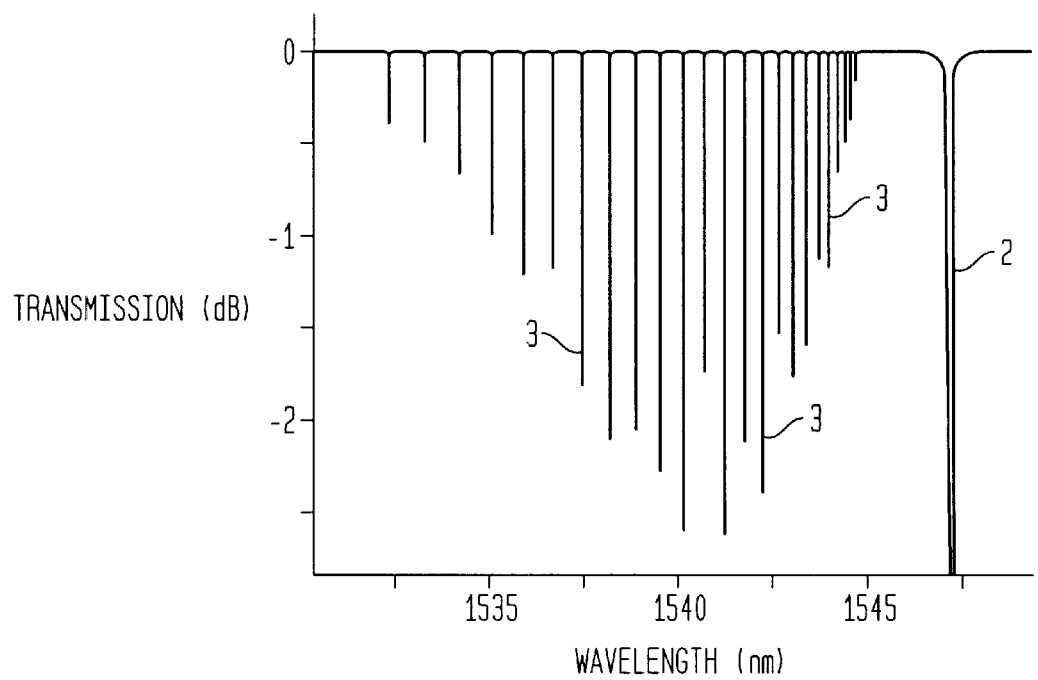
FIG. 2 is a graphical representation of the transmission characteristic of the optical fiber grating of FIG. 1 useful in understanding the problem to which the invention i directed.

FIG. 2 illustrates the transmission characteristic of the FIG. 1 conventional device, showing the main Bragg resonance 2 and the shorter wavelength cladding loss resonances 3. It is noteworthy that the closely spaced cladding mode resonances begin only 2 nm short of the main Bragg resonance 2 and extend below 1530 nm. These cladding mode losses limit the useful bandwidth of the Bragg filter. Bragg gratings in planar waveguides encounter similar short wavelength cladding mode loss.

II. Improved Gratings of the Invention

In accordance with the invention, optical waveguide gratings are improved by roughening or configuring the outer surface to scatter in a non-coherent manner light incident from within the waveguide.

To produce the scattering, the outer surface of the waveguide can be provided with perturbations in its optical characteristics that are sufficient to disrupt light wavefronts from within the fiber. The perturbations can be either random disruptions, such as etch pits, ablation pits and particles optically coupled to the surface, or they can be regular, such as variations in the thickness of the waveguide along the length of the grating. In the case of random perturbations, the density of perturbations on the surface should be sufficient to scatter such light from the grating in a noncoherent manner.

Figure 3:
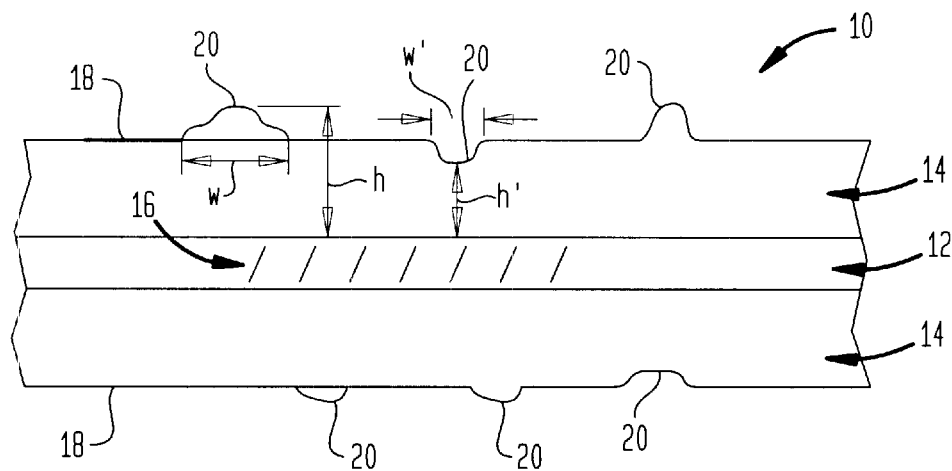
FIG. 3 is a cross-sectional view of an optical waveguide grating in accordance with the invention.

FIG. 3 is a cross-sectional view of one embodiment of an optical waveguide 10 that includes a longitudinally extended core 12 and a cladding layer 14 peripherally surrounding the core 12. The core 12 houses an optical Bragg grating 16. The core 12 and cladding layer 14 form an integrated structure in which the cladding layer 14 has a lower index of refraction than the core 12. The index difference makes light propagate in the core due to total internal reflection.

An outer surface 18 of the cladding 14 has a plurality of height perturbations 20. Each perturbation 20 has a surface height h, h' that varies by at least as 0.1 times the Bragg wavelength of the optical grating 16 over the lateral extent w, w' of the perturbation 20. Adjacent height perturbations 20 have lateral separations of less than about 10 to 100 times the Bragg wavelength of the grating 16. Herein, heights are defined to be distances of surfaces with respect to the core 12. The lateral extent w, w' of each perturbation 20 along the outer surface 18, and the height variation over the perturbation, are both between about 0.1 and 100 times the Bragg wavelength.

The height perturbations 20 cause scattering of light incident on outer surface 18 from the interior of the waveguide 10. The scattering reduces optical losses caused by optical modes of the cladding layer 14.

Figure 4:
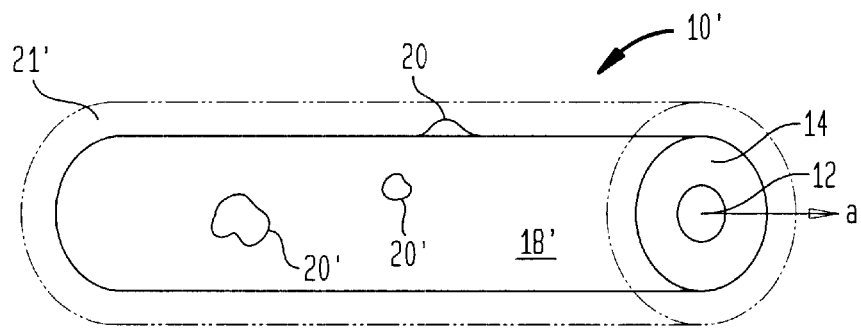
FIG. 4 shows an embodiment wherein the waveguide is an optical fiber.

FIG. 4 shows an embodiment in which the waveguide is an optical fiber 10'. In the fiber 10', the core 12 and cladding layer 14 are doped silica layers of the fiber 10' that have different indexes of refraction. The core 12 and cladding layer 14 form the integral silica-glass structure of the optical fiber 10'. The cladding layer 14 may include one or more silica glass layers (not shown) and may be covered by a protective polymer layer 21'. In the fiber 10', the height of perturbation 20' is measured by the local radius of outer surface 18' with respect to the longitudinal axis "a" of the fiber 10'.

Figure 5:
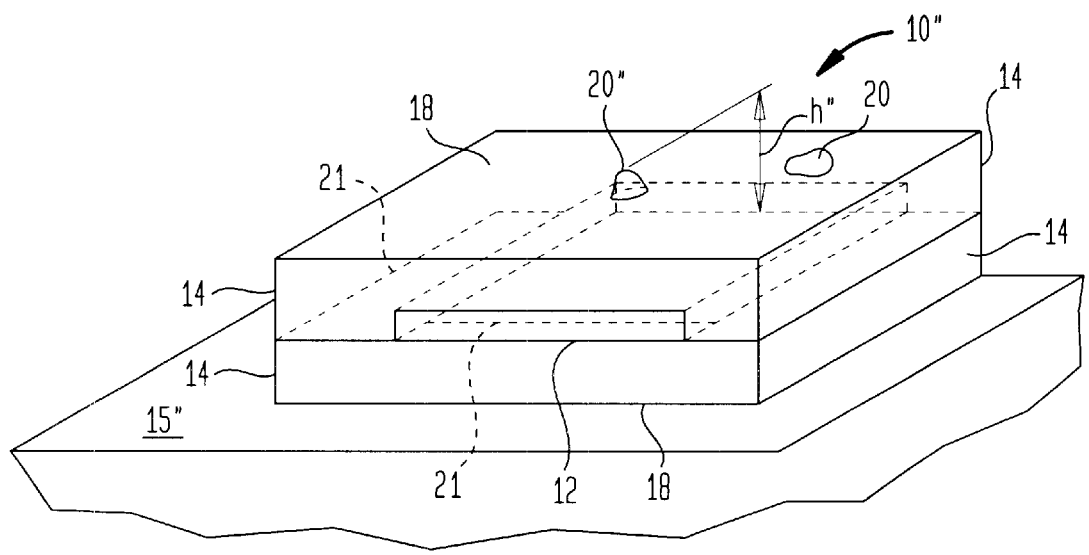
FIG. 5 illustrates an embodiment in which the waveguide is a planar waveguide.

FIG. 5 shows an embodiment in which waveguide grating 10 of FIG. 3 is a planar waveguide 10". In the planar waveguide 10", the core 12 is a strip and the cladding layers 14 are planar layers constructed on a substrate 15". The core 12, cladding layer 14, and substrate may, e.g., be layers of semiconductor materials with different indexes of refraction. For the planar waveguide 10", the height of a perturbation 20" on outer surfaces 18" is measured by the local perpendicular distance, h", of the perturbation 20" from an imaginary plane 21. The plane 21 bisects the core 12 and is parallel to the interface between the core 12 and cladding layer 14.

FIG. 6–9 illustrate several embodiments for the height perturbations 20.

Figure 6:
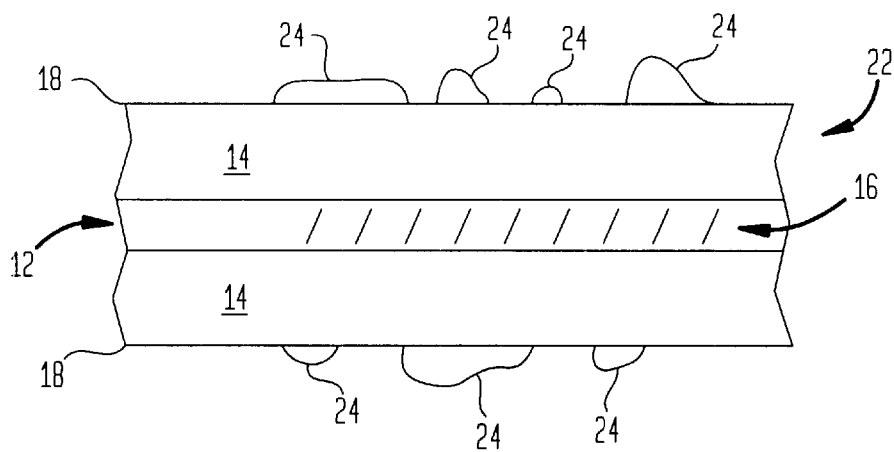
FIG. 6 shows an embodiment wherein the height perturbations are particles.

FIG. 6 shows an embodiment 22 of waveguide 10 of FIG. 3 in which the height perturbations 20 are particles 24 located on and bonded to the outer surface 18. The sizes of and separations between the particles 24 are between 0.1 and 100 times the Bragg wavelength of optical grating 16. In various embodiments, the particles 24 have either a uniform distribution or a pseudo-random distribution on the outer surface 18.

Herein, a pseudo-random distribution is defined by a mean value and by either a variance of the mean value or by a width at half-maximum. The mean value provides a length scale for the distribution, e.g., an average particle/pit size or an average distance between particles/pits. In a pseudo-random distribution, the variance or width at half maximum is larger than 0.1 times the Bragg wavelength of the grating and may have a value between 1 and the smaller of 100 times the Bragg wavelength or 20 percent of the diameter of the waveguide, e.g., a fiber.

Figure 7:
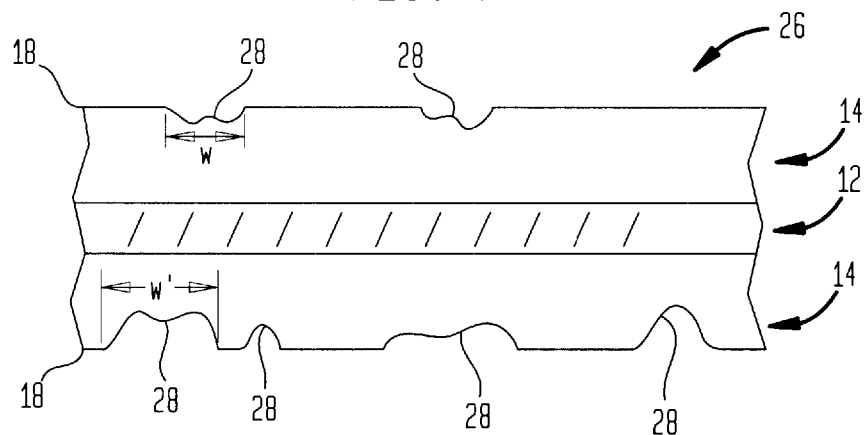
FIG. 7 illustrates an embodiment in which the height perturbations are pits.

FIG. 7 shows an embodiment 26 of waveguide 10 of FIG. 3 in which the height perturbations are pits 28 in the outer surface 18. The lateral extent w, w' of the pits 28, and the distances between the pits 28 are between 0.1 and 100 times the Bragg wavelength of optical grating 16. In various embodiments, the pits 28 have either one size or a pseudo-random distribution of sizes. Similarly, in various embodiments, the pits either cover the outer surface 18 uniformly or have a pseudo-random distribution on the outer surface 18.

Figure 8:
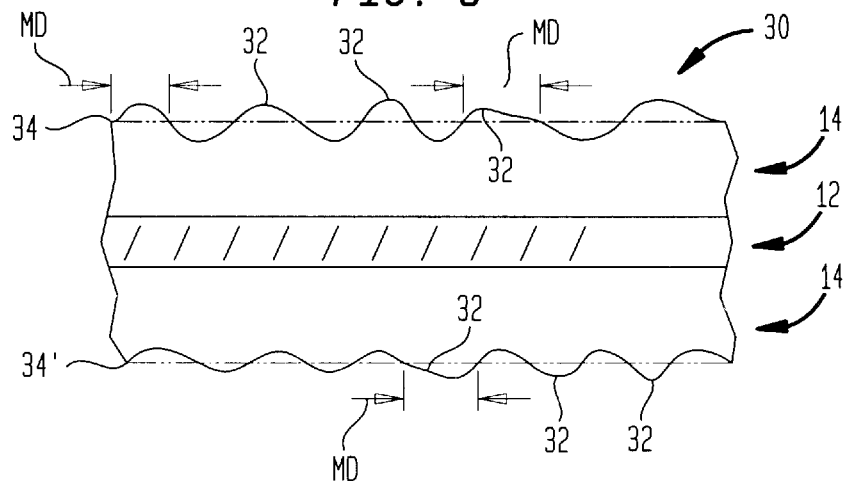
FIG. 8 shows an embodiment wherein the perturbations are regions of changed height.

FIG. 8 shows another embodiment 30 of waveguide 10 of FIG. 3 in which the height perturbations are regions 32 of changed height on outer surface 18. A region 32 has a height change with respect to average surface height 34 or between 0.1 and 100 times the Bragg wavelength of the grating 16. The maximum distance, MD, between points on the region 32 at which the height equals the average surface height 34 or 34' is between 0.1 and 100 times the Bragg wavelength.

Figure 9:
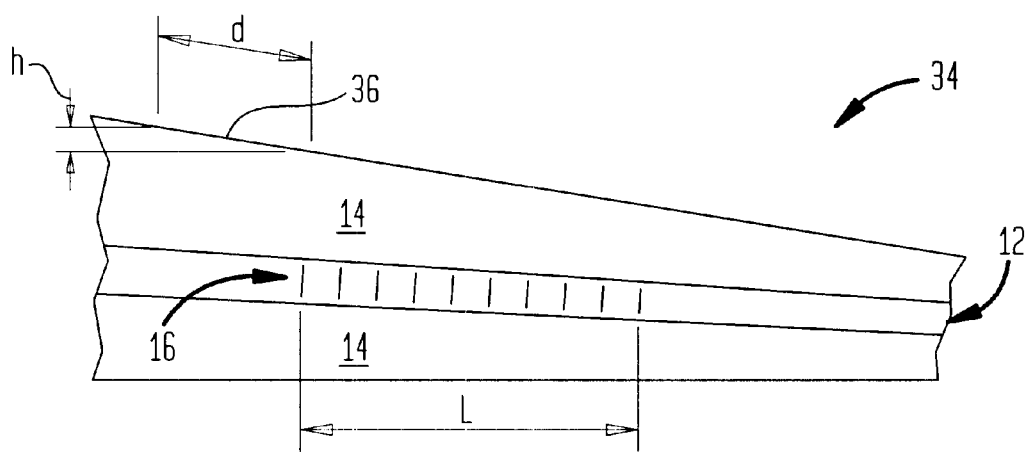
FIG. 9 illustrates an embodiment in which the perturbations are tapered regions.

FIG. 9 shows another embodiment of a grating waveguide 34 for which height perturbations 20 of FIG. 3 are regions 36 of outer surface 18 that have sloping height with respect to the core 12. In embodiments in which the waveguide 34 is an optical fiber, the slope is caused by a taper of the outer diameter of the fiber. On the sloping region 36, the surface height "h" with respect to the core 14 changes by between 0.1 and 100 times the Bragg wavelength of grating 16 over a length "d" of about 0.5 times the length L of grating 16. Thus, the slope of surface 18 with respect to the core 12 is about 0.05 to 50 Bragg wavelengths per length L of the grating 16. Herein, height variations that are sloping regions 36 are defined to be regions of lateral extent of less than about 100 times the Bragg wavelength of the grating 16. The surface 18 may have a series of sloping regions 36 that are either connected or separated by less than about 100 times the Bragg wavelength. If the sloping regions 36 are connected to form a larger tapered region, that region has an extent of less than about 1 or 10 cm and often has an extent of less than 1–10 times the length L of the grating 16.

Some embodiments combine several types of perturbations 20 of the outer surface 18, shown in FIG. 3. For example, the perturbations in one embodiment include pits in the surface 18, particles on the surface 18, and tapered regions of the surface 18.

EXAMPLE 1

Fabrication By Etching

Figure 10A:
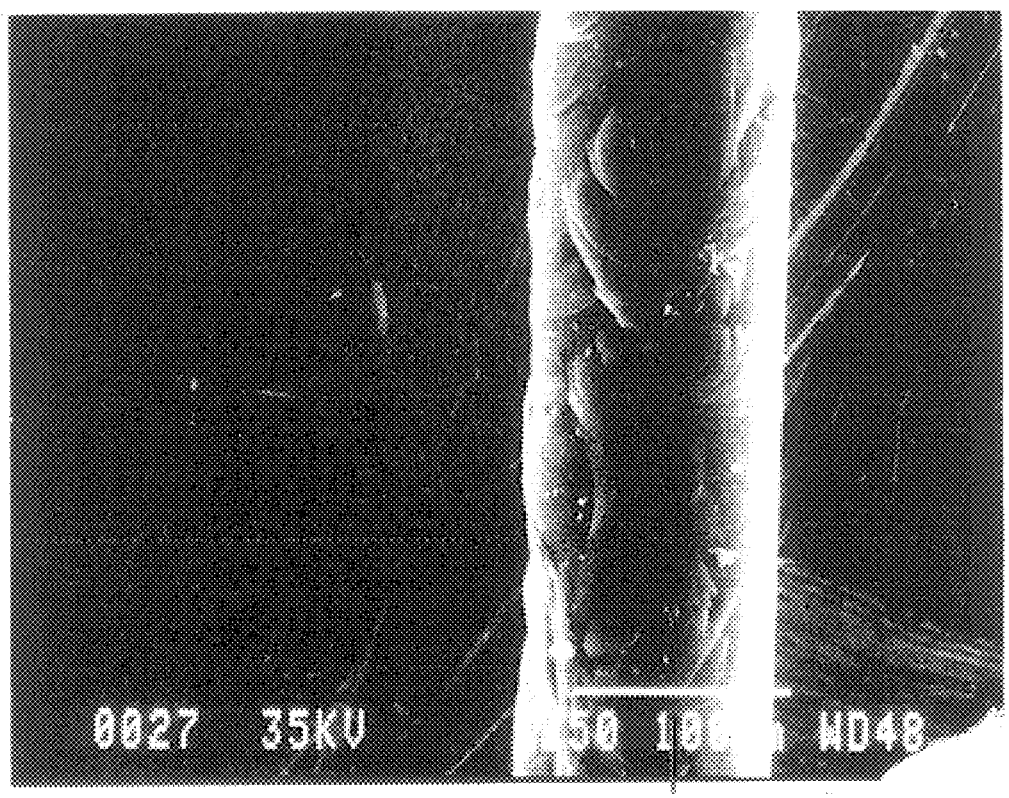
FIG. 10A is a photographic illustration of an improved optical fiber grating roughened by etching.

An exemplary roughening process involves disposing a waveguide grating for 20 minutes in an etch bath comprising hydrofluoric acid such as #15–0275 Etch Bath marketed by Armour Products Co., Wyckoff, N.J. 07481. After etching and rinsing, the outer surface 18 had the height perturbations photographically depicted in FIG. 10A.

Figure 10B:
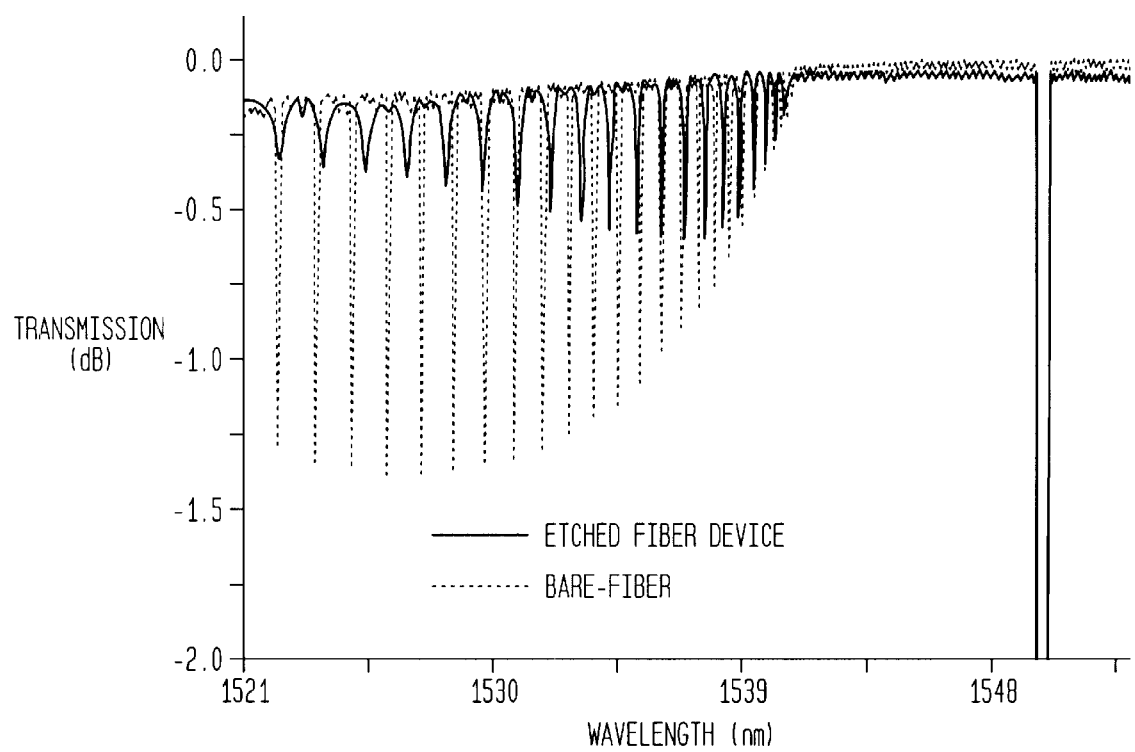
FIG. 10B transmission spectrum of the improved grating of FIG. 10A.

FIG. 10B is a graphical illustration showing the transmission coefficient before and after roughening of outer surface of the cladding of a waveguide grating. The dashed-lie curve shows the cladding mode resonances before etching. The solid-line curve shows the cladding mode resonances after etching. The strength of the cladding modes are diminished to ½ their pre-etched level.

Figure 11:
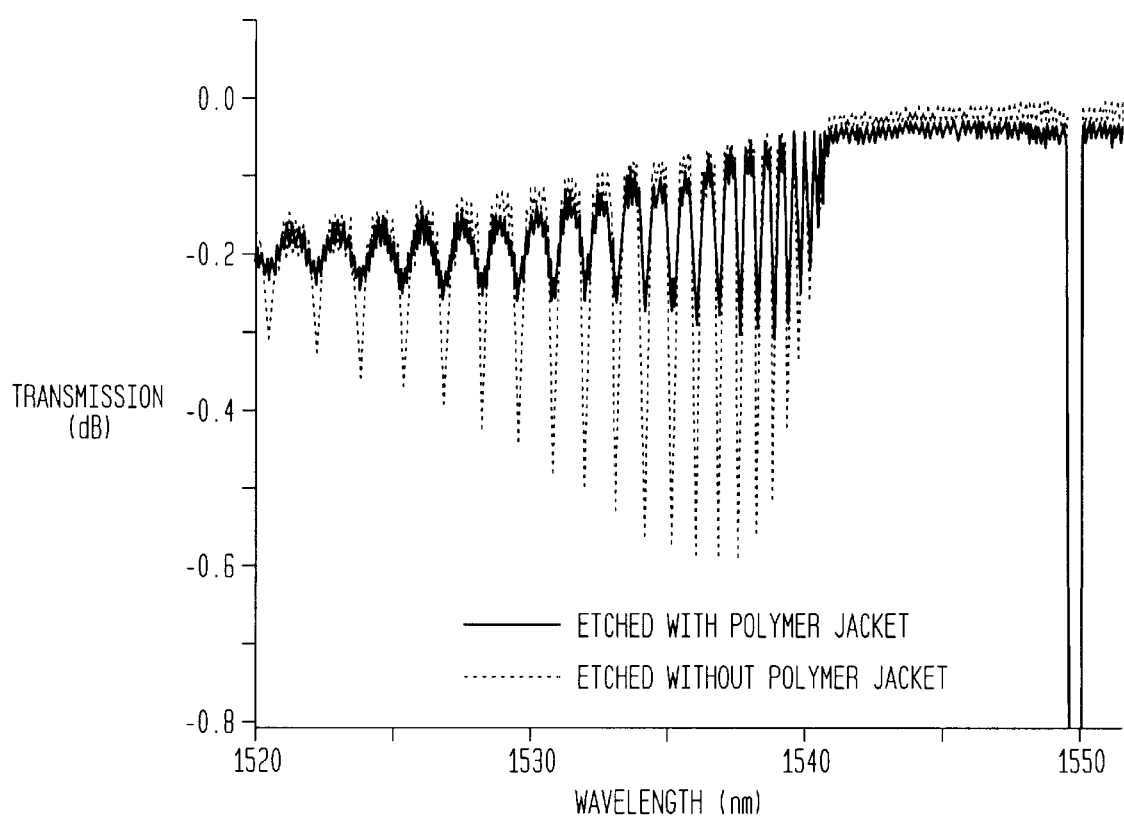
FIG. 11 is a graphical illustration showing the effect of recoating an etch roughened grating with protective polymer.

FIG. 11 is a graphical illustration showing the effect on the transmission coefficient of recoating a roughened grating with protective acrylate based polymer. The dashed curve shows the cladding mode resonances after etching. The solid curve shows the cladding mode resonances after recoating. The strength of the absorption resonance caused by cladding modes are again diminished.

In some embodiments, metal coatings are applied on waveguide gratings to make the gratings tunable by resistive heating. An advantage of the present invention is its compatibility with subsequent metal coatings. The absorption resonances suppressed by etching the surface remain suppressed after metal coating.

EXAMPLE 2

Fabrication By Laser Ablation

Figure 12:
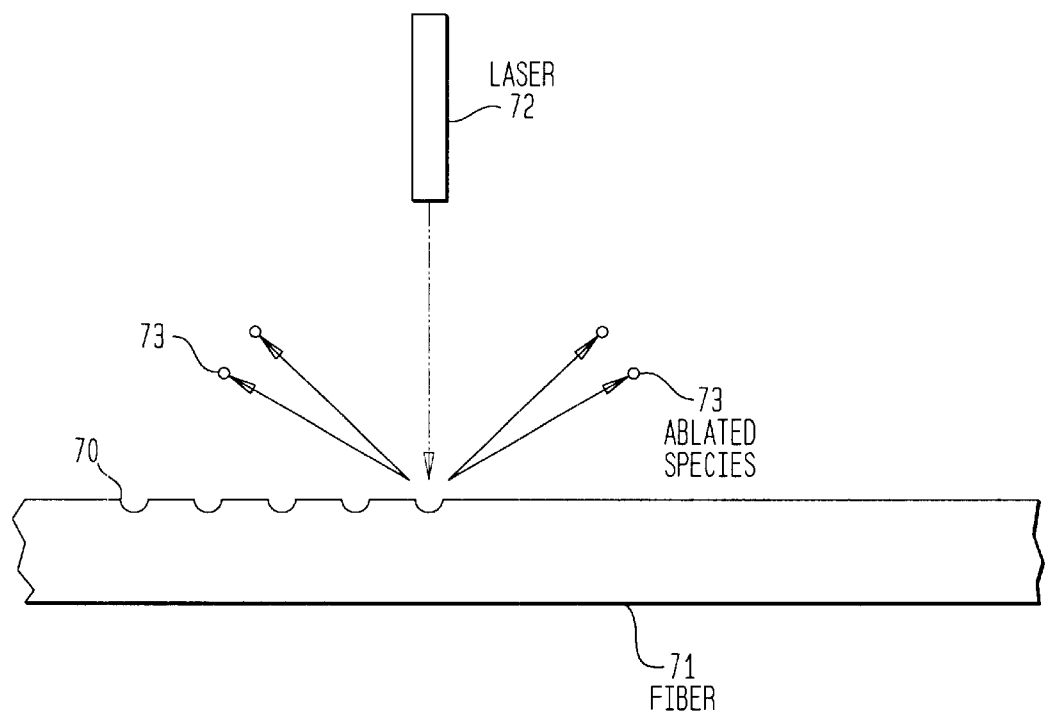
FIG. 12 is a schematic cross section of an improved optical fiber grating roughened by laser ablation.

Cladding mode loss in a waveguide Bragg grating can also be reduced by roughening the outer surface of the cladding through laser ablation. As illustrated in FIG. 12 random or ordered patterns of rough pits 70 can be achieved on a fused silica fiber 71 by focusing a high power pulsed laser 72 with ultraviolet (e.g. 157 nm wavelength) or infrared (e.g. 10.6 μm wavelength) emission on the surface. Due to absorption at those wavelengths, extreme heat is generated at the surface thereby ablating atoms or clusters of atoms 73 from the fiber surface. The degree of roughness can be controlled by pulse rate and fluence of the laser. In addition, the spot sizes and shapes of laser pulses on the surface of the fiber can be manipulated similar to laser machining to form ordered patterns of roughness.

EXAMPLE 3

Fabrication By Particle Coating

Figure 13:
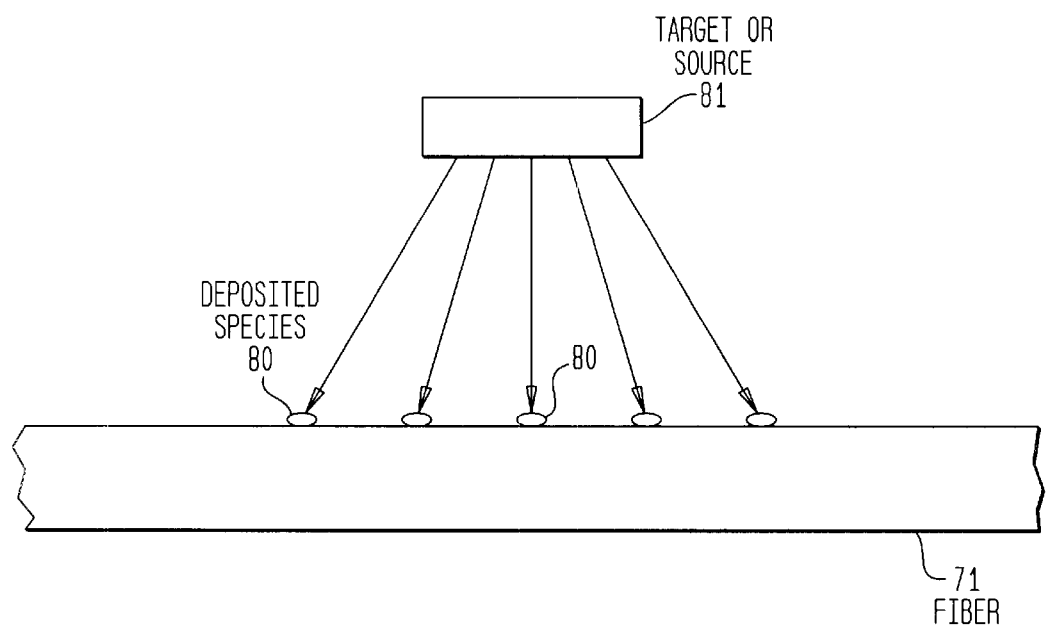
FIG. 13 shows a cross section of a grating roughened by coating with particles.

Alternatively, as shown in FIG. 13, deposition of particulates 80 can randomly roughen the surface of a waveguide 71. The particulates 80 can be deposited through spray pyrolysis of chemical precursors, such as inorganic nitrates, in which a source 81 produces an aerosol of oxide particulates which is then deposited on the waveguide. The particulate 80 can also be deposited by dipping a waveguide in a colloidal suspension (sol) and then by thermally treating to make a rough surface. The particulates do not need to have the same chemical composition of the waveguide. For example, the colloid could include an organic polymer or inorganic oxide.

EXAMPLE 4

Fabrication By Particle Coating

The particles can be made of a material that is softer than the cladding material to prevent mechanical damage to the cladding. They should have a refractive index sufficiently different from that of the cladding to cause effective scattering. Polymer particles are suitable for this application, especially when the waveguide has a silica-based cladding (e.g. an optical fiber), because polymer particles are softer than glass and most polymers have refractive indices different from that of silica.

Polymer particles can be, for example, synthesized using emulsion polymerization. Polystyrene microspheres with well defined sizes ranging from 0.1 to several micrometers are commercially available from Polysciences Inc., Warrington, Pa. One micrometer polymer spheres are convenient when the Bragg wavelength of the grating is around 1.0–1.6 micrometers. Polystyrene microspheres are supplied as a latex emulsion in water. The microspheres can be deposited on a substrate like a (bare) optical fiber simply by dipping the fiber in the latex and then letting it dry. The microspheres cling to the fiber presumably by electrostatic interactions. Final bonding of the microspheres can be achieved by first treating the fiber with a silane coupling agent, and then dipping the treated fiber into an emulsion with the functionalized microspheres. The functional group in the microspheres is chosen to react with the functional group of the silane coupling agent. Alternatively, one can employ microspheres with reactive groups that react directly to the silica surface. The microspheres can have a selected size or a distribution of sizes.

As a specific example, a coupling agent solution was prepared by dissolving 0.5% of 3-glycidoxypropltrimethoxysilane in de-ionized water whose pH had previously been adjusted to 4 by adding acetic acid. A commercial telecommunications fiber was stripped of its polymeric protective coatings by immersing it for one minute in hot sulfuric acid (185° C.), and then rinsing the fiber in methanol. The stripped portion of this fiber was then dipped into the coupling agent solution for one minute. The fiber was dried at 110° C. for 10 minutes. The coupling agent solution contains silanol molecules (the methoxy groups in the silane hydrolize the silanol groups in the acidified water). The silanol groups and methoxy silane groups react with the silica surface of the fiber to create strong silicon-oxygen-silicon bonds. Thus reaction produces a silica fiber coated by silane molecules, which are bonded covalently to the glass. The treated fiber is then contacted with a latex containing amine-functionalized polystyrene microspheres (1 micrometer in diameter). The amine groups on the surface of the polystyrene microspheres react with the glycidyl groups of the silane on the fiber to bond the spheres covalently to the glass surface through the coupling agent molecules.

Figure 14:
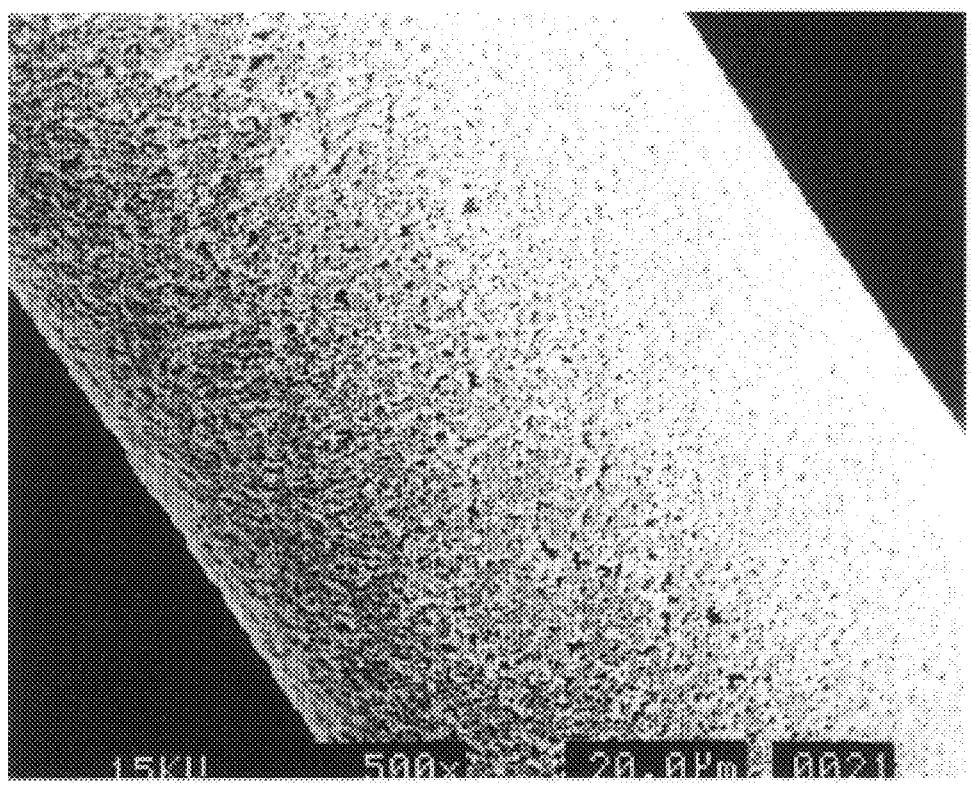
FIG. 14 is a photographic illustration of an improved optical fiber grating roughened by coating with particles.

FIG. 14 is a scanning electron microscope photograph of a fiber treated as described above. It shows excellent coverage of the fiber cladding surface by the microspheres.

Alternatively, the cladding can be coated with a microphase-separated system, such as a microphase-separated polymer blend or a co-polymer. The composition fluctuations of the microphase-separated system will scatter light if the refractive indices of the components of the system differ sufficiently. It is possible to control the morphology and domain size of these polymeric systems to achieve the desired optical results. For example, those skilled in the art know that they can modify the morphology and domain size of the micro-phase separated systems by employing block copolymers with different block sizes, molecular weights and interaction parameters.

III. Applications

The improved gratings can be fabricated as fixed or tunable, chirped or nonchirped gratings by techniques well known in the art. It is contemplated that the gratings will have important applications in optical communication systems, especially in compensation of chromatic dispersion. FIGS. 15–18 schematically illustrate optical communication systems comprising the improved waveguide gratings, e.g. the waveguide gratings of FIGS. 3–9.

Figure 15:
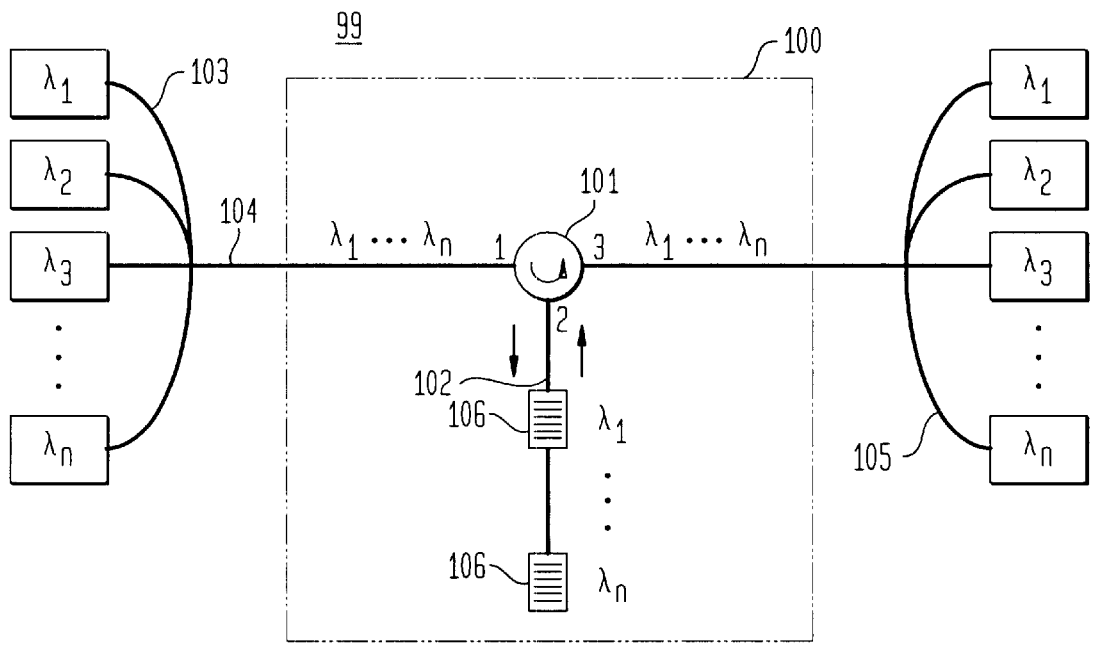
FIG. 15 is shows a dispersion compensation module (DCM)

In FIG. 15 schematically illustrates an improved optical communication system 99 employing a dispersion compensating module (DCM) at boxed region 100. The DCM 100 comprises an optical circulator 101 and a fiber 102 having a series of "n" improved gratings 106. Each grating has an associated Bragg reflection wavelength $\lambda_1, \lambda_2, \ldots \lambda_n$. The serial order in which the gratings are placed in the fiber 102 depends on the chromatic dispersion that accumulated by light before reaching the DCM. For example, if the accumulated dispersion $A_D(\lambda)$ for light with wavelength $\lambda_1$ is greater than that of light with wavelength at $\lambda_n$, i.e. $A_D(\lambda_1) > A_D(\lambda_n)$, then the gratings are arranged such that incident light first encounters the compensating grating of the DCM with Bragg wavelength at $\lambda_1$ and last encounters the grating with Bragg wavelength at $\lambda_n$. If the accumulated dispersion for channel 1 at wavelength $\lambda_1$, is less than that of channel n at $\lambda_n$, $A_D(\lambda_1) < A_D(\lambda_n)$, then the gratings are serially ordered in the reverse of the order shown, i.e., the first encountered compensating grating of the DCM is at $\lambda_n$ and the last grating has a Bragg wavelength $\lambda_1$. This DCM may comprise part of a dense WDM system (DWDM), further comprising a multi-wavelength optical transmitter 103, a length of transmission optical waveguide (optical fiber) 104, and a multiwavelength optical receiver 105.

Figure 16:
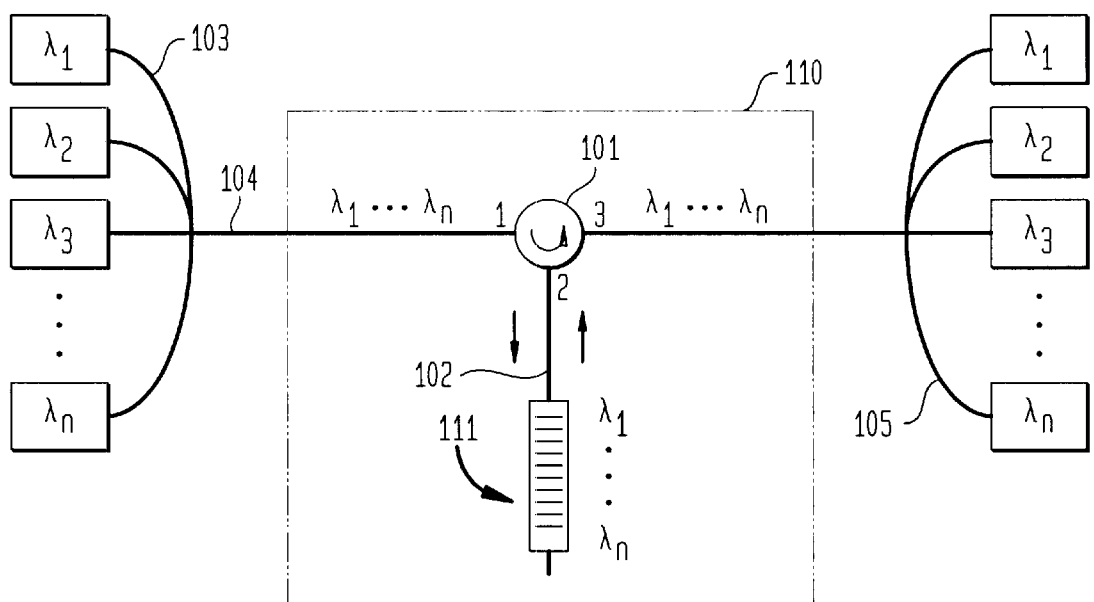
FIG. 16 illustrates a first alternate embodiment of a DCM.

In the alternate embodiment of FIG. 16 the DCM 110 comprises a single tunable dispersion compensating chirped fiber grating 111 in place of the "n" dispersion-compensating gratings 106. The direction of the chirp depends on the accumulated chromatic dispersion.

Figure 17:
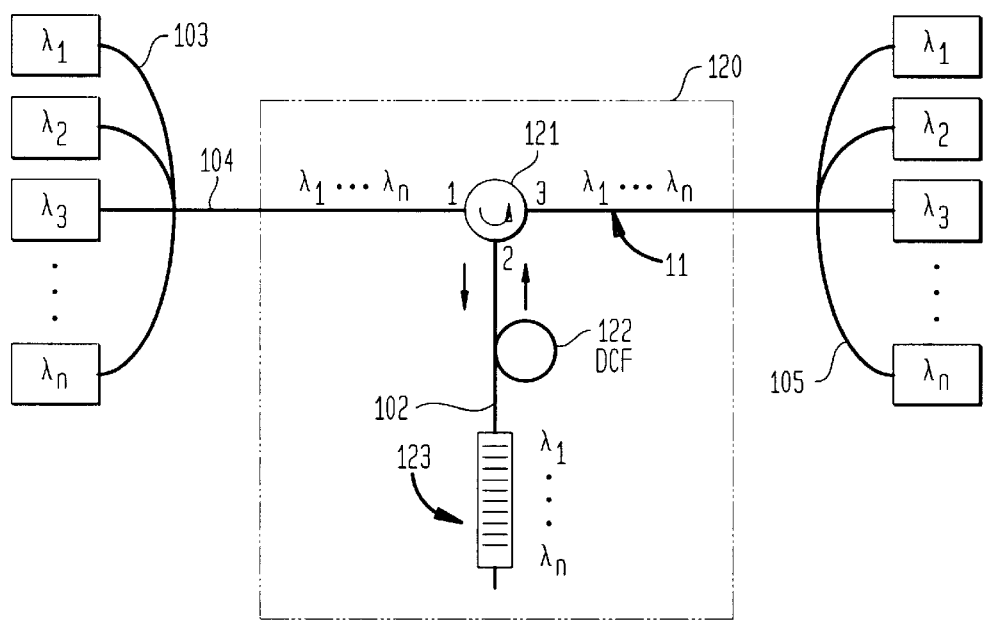
FIG. 17 illustrates a second alternate embodiment of a DCM.

FIG. 17 schematically illustrates a system where a DCM 120 comprises an optical circulator 121, a length of dispersion compensating fiber (DCF) 122, and a single tunable dispersion compensating chirped fiber grating 123. Alternatively to the single chirped grating device 123, a plurality of independently tunable dispersion compensating gratings may be used. In this case, the majority of the chromatic dispersion compensation is performed by the DCF 122. The remanent chromatic dispersion in each channel, due to a dispersion slope mismatch between the ideal compensator and the DCF, is compensated using the compensating chirped grating 123. The same principles described above with reference to FIG. 15 relating to the direction of the chirped dispersion grating or the order of the gratings apply. Also, this DCM 120 may belong to a DWDM further including a multi-wavelength transmitter 103, a length of optical fiber 104, and a multi-wavelength receiver 105.

Figure 18:
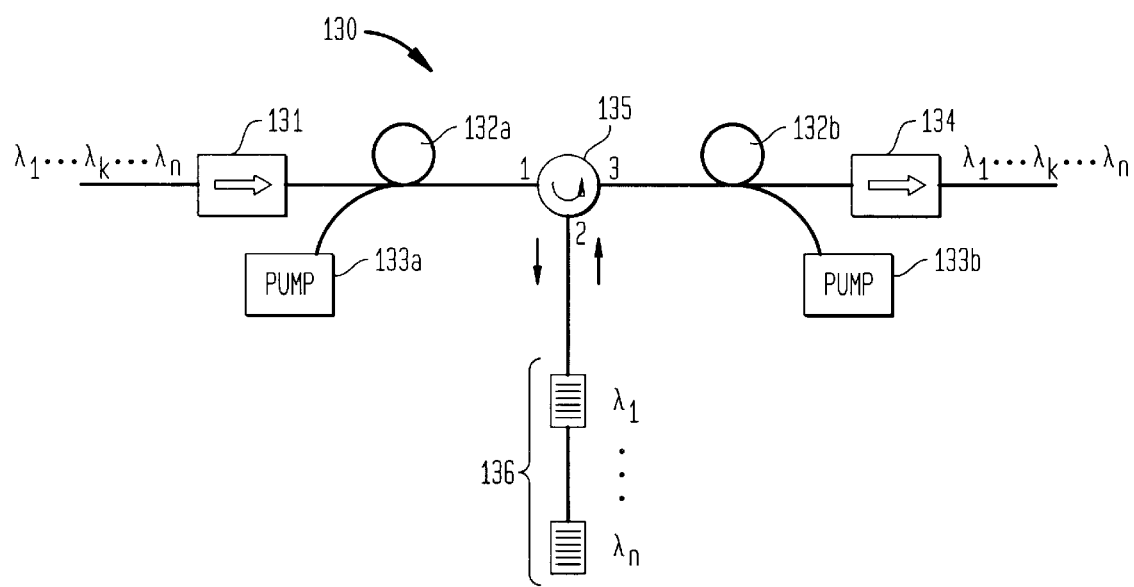
FIG. 18 shows an optical amplifier.

FIG. 18 schematically shows an amplifier 130 provided with dispersion compensation. The amplifier 130 comprises an input isolator 131, a first length of rare-earth doped fiber 132a, a first pump 133a for optical pumping the first length of fiber 132a, a second length of rare-earth doped fiber 132b, a second pump 133b for optical pumping the second length of fiber 132b, an output isolator 134, a circulator 135 and n serially ordered independently tunable dispersion-compensating gratings 136. The optical amplifier provides the advantage that it not only compensates for chromatic dispersion, but it also amplifies the signals to offset losses introduced by the gratings 136. Optionally, a dispersion compensating fiber may be used similarly to FIG. 17.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. An optical waveguide, comprising:
   a longitudinally extended core including an optical Bragg grating;
   a cladding layer peripherally surrounding the core, forming an integrated structure with the core and having a lower index of refraction than the core, an outer surface of the cladding layer having a plurality of height perturbations, each perturbation having a height with respect to the core that varies by at least 0.1 times a Bragg wavelength of the grating over a region of the surface whose lateral extent is less than about 100 Bragg wavelengths, distances between adjacent ones of the perturbations being less than about 100 Bragg wavelengths.

2. The optical waveguide of claim 1, wherein the cladding layer comprises one of silica glass and a semiconductor.

3. The optical waveguide of claim 1, wherein the cladding and core form an optical fiber.

4. The optical waveguide of claim 3, wherein the perturbations include pseudo-random smoothness variations of the outer surface of the fiber.

5. The optical waveguide of claim 3, wherein the perturbations include particulate matter located on the outer surface.

6. The optical waveguide of claim 5, wherein the particulate matter includes a polymer.

7. The optical waveguide of claim 3, wherein the perturbations include pits located in the outer surface.

8. The optical waveguide of claim 3, wherein a portion of the perturbations produce variations of the distance of the outer surface from the core by at least a Bragg wavelength of the grating.

9. The optical waveguide of claim 1, wherein the core and cladding form a planar waveguide.

10. The optical waveguide of claim 9, wherein the perturbations include pseudo-random variations of the distance of at least one outer surface of the cladding from a central plane bisecting the core.

11. The optical waveguide of claim 10, wherein the perturbations include particulate matter located on the one outer surface.

12. The optical waveguide of claim 11, wherein the particulate matter includes a polymer.

13. The optical waveguide of claim 10, wherein the perturbations include pits located in the one outer surface.

14. The optical waveguide of claim 10, wherein a portion of the perturbations produce variations of the distance between the one outer surface and the bisecting plane that are at least as large as a Bragg wavelength of the grating.

15. The optical waveguide of claim 3, wherein the height perturbations form a smooth and connected taper, an outer diameter of the fiber varying by at least 0.1 times the Bragg wavelength over a length of the taper equal to about 0.5 times the grating's length.

16. The optical waveguide of claim 15, wherein an outer diameter of the fiber varies by less than 10 times the Bragg wavelength over a length of the taper equal to about 0.5 times the grating's length.

17. An apparatus, comprising:
    an optical circulator having at least three ports; and
    an optical waveguide being connected to one of the ports, the waveguide comprising:
       a longitudinally extended core including an optical Bragg grating;
       a cladding layer peripherally surrounding the core, forming an integrated structure with the core and having a lower index of refraction than the core, an outer surface of the cladding layer having one or more perturbations, each perturbation having a height with respect to the core that varies by at least 0.1 times a Bragg wavelength of the grating over the surface of the perturbation and covering an extent of the outer surface whose linear dimensions are less than 1 centimeter.

18. The apparatus of claim 17, wherein the waveguide is an optical fiber.

19. The apparatus of claim 17, further comprising:
    a second optical waveguide connected to one of the other ports of the circulator and configured to receive light from a pump light source and an external source.

20. The apparatus of claim 17, further comprising:
    one of an optical multiplexer and an optical demultiplexer, the one of an optical multiplexer and an optical demultiplexer being connected to one of the other ports of the circulator.

21. In an optical waveguide communication system comprising an optical transmitter, a length of optical transmission waveguide, at least one waveguide Bragg grating, and an optical receiver,
    the improvement wherein the waveguide Bragg grating comprises an optical waveguide according to claim 1.

* * * * *